Aug. 18, 1970

H. S. JEBE 3,524,469

CHECK VALVE

Filed Jan. 25, 1968

INVENTOR.
Howard S. Jebe
BY
John J. Kowalik
Attorney

United States Patent Office

3,524,469
Patented Aug. 18, 1970

3,524,469
CHECK VALVE
Howard S. Jebe, 8759 S. 81st Court,
Oak Lawn, Ill. 60458
Filed Jan. 25, 1968, Ser. No. 700,452
Int. Cl. F16k 15/02
U.S. Cl. 137—543.19                3 Claims

ABSTRACT OF THE DISCLOSURE

A check valve having a guiding cage in intimate contact with the valve body for dissipating heat and dividing the air flow to provide substantially equal thermal balance about the entire valve body.

BACKGROUND OF THE INVENTION

Field of the invention

This invention relates to check valves particularly useful in pneumatic systems and the like.

Discussion of the prior art

The difficulties encountered in the prior art involve principally the adequate dissipation of heat which is generated when the air under pressure unseats the valve element and flows about it past the valve seat to the exit port. Depending upon the design of the valve, the casing becomes heated and in many instances there develop localized hot spots for short periods of time which may reach as high as four to five hundred degrees Fahrenheit. This has a pronounced deleterious effect on the valve element and surrounding body structure by distorting it and causing other malfunctions such as improper seating of the valve element on the seat or erosion of these parts whereby frustrating the seal.

SUMMARY OF THE INVENTION

This invention is directed to a check valve having good heat dissipating characteristics and a good functional life.

A further object is to provide a valve having an air passage or bore therein snugly confining a cage which is constituted of a pair of U-shaped elements arranged perpendicular to each other and interconnected at their bight portions, the legs of the cage elements subdividing the bore into quadrants to provide air channels therebetween and enclosing a valve element biased by a spring within the cage and compressed between the closed end of the cage and the valve element which is disposed at the open end of the cage and seats against a valve seat at the outlet end of the inlet port.

More particularly the invention comprehends the provision of a valve which lends itself to simple manufacturing practices which reduce its cost.

These and other objects of the invention will become more readily apparent from the specifications and the drawings, wherein.

DESCRIPTION OF THE INVENTION

Figure 1:
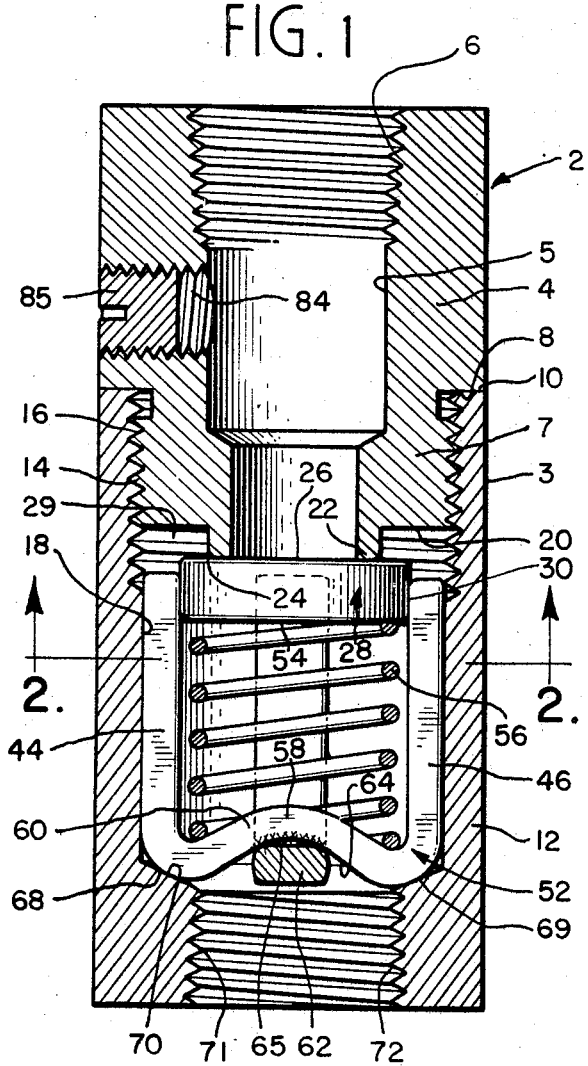
FIG. 1 is a longitudinal sectional view of my novel valve.
Figure 3:
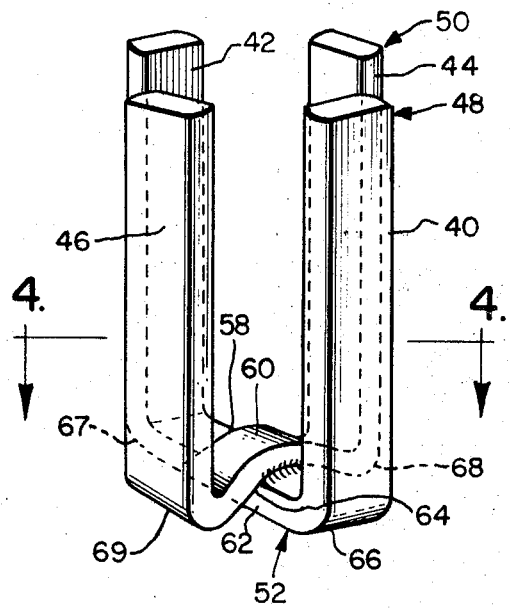
FIG. 3 is a perspective view of the novel cage used in the valve.
Figure 4:
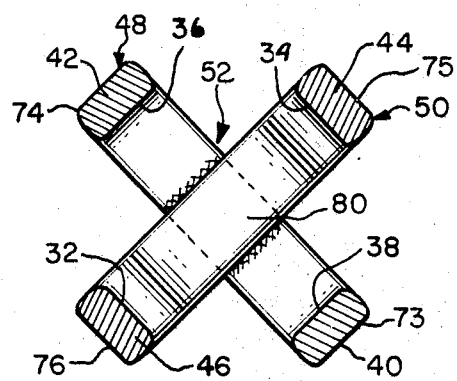
FIG. 4 is a cross-sectional view of the cage taken substantially on line 4—4 of FIG. 3.
Figure 2:
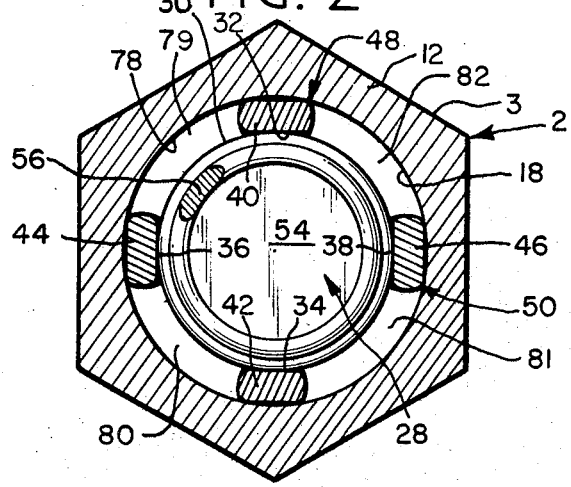
FIG. 2 is a cross-sectional view taken substantially on line 2—2 of FIG. 1.

Describing the invention in detail and having particular reference to the drawings there is shown a check valve generally designated 2 having a body or housing 3 which is preferably made of metal of high thermal efficiency. The body comprises an inlet port element 4 which has an inlet bore or port 5 therein internally threaded at one end as at 6 for interthreaded connection with a pressure line (not shown). The port 4 has a reduced inner section 7 defining a radial shoulder 8 which tightly engages the inner end edge 10 of the outlet port element 12 upon the inner externaly threaded portion 14 being threaded into the internal threads 16 which are formed on the inner end of the valve chamber or valve bore 18 of element 12.

The inner end 20 of element 4 is formed with an annular axially projecting seat 22 having a rounded peripheral lip 24 against which is seated a flat outer side 26 of a disk-like annular valve element 28 which is preferably, but not necessarily, made of plastic such as is commonly sold under the trademark "Delrin" which is an acetyl resin and more particularly a polyoxymethylene, which means that it is principally made up of recurring $CH_2O$ units. The material is more adequately described in U.S. Patent 2,768,994 issued to R. N. McDonald on Oct. 30, 1956. The material possesses properties of high impact strength, durability and can be readily molded. It provides flexibility and greatly resists abrasion and wear due to the action of the air and entrained microparticles blasting past the valve. It will be understood that "Teflon" or other fluorocarbon resin disks could be used or any other suitable material well known in the art.

An annular air accumulating head 29 is developed about the seat 22. The valve disk diameter is larger than the diameter of the seat and has an annular peripheral edge 30 which fits tangentially between the flat internal sides 32, 34, 36, 38 of the legs 40, 42, 44, 46 of the U-shaped elements 48, 50 of the cage generally designated 52.

The inner flat side 54 of the valve disk 28 provides a seat for one end of a compression spring 56 which at its other end fits over a boss 58 which is formed by an inwardly offset bight portion 60 extending between the legs 48, 50 of the cage element 52. The bight portion 60 receives a generally straight bight 62 in its concavity 64 in back thereof whereat the bight portions 60, 62 are interconnected as by welding at 65.

The inner end of each leg 40–46 is rounded or convexed at 66, 67, 68, 69 and seat tangentially against a conical surface 70 which extends from the bore 18 toward the reduced diameter outlet port 71 which is threaded at 72 to connect to associated piping. It will be seen that the external sides 73, 74, 75 and 76 of legs 40–46 extend chordally with respect to the bore surface 78 and thus when the cage heats it can creep along this surface without binding. These legs 40–46 define air passage quadrants 79, 80, 81 and 82 to insure equal distribution of the air volume in the valve chamber to insure good thermal distribution and thus avoid localized hot spots.

It will be noted that the inlet port is provided with a connecting bleed off port 84 which in the present instance is closed by a threaded plug 85.

A novel and effective check valve has been provided which is easy to manufacture and install, that operates relatively cool, quietly and at any angle of installation. It operates by the pressure of the air passing therethrough and is not dependent upon any external control or power. It is durable, of simple design and easy to service by replacing or reworking worn or damaged parts without special tools.

The valve develops minimal constriction and buffeting thus reducing heat generation, power loss and hammering which adversely strains the valve and associated mechanism.

The lower operating temperatures assure longer life of the sealing surfaces.

The valve disk is reversible for new seating surfaces and these surfaces as well as the mating surface is renewable in the field with simple hand tools (file, sandpaper, etc.).

A preferred form of the invention has been described. However, other forms of the invention will become readily apparent within the scope of this invention and which are intended to be covered by the appended claims.

I claim:

1. In a check valve, a housing having an inlet port and an outlet port and an intervening valve chamber having an internal cylindrical surface and transaxial surfaces adjacent to respective ports, means providing a valve seat about the inlet port extending into said chamber from said transaxial surface thereadjacent and forming an air accumulating head thereabout, a cage within the chamber comprising a pair of U-shaped members arranged in intersecting relation to each other and comprising legs with generally flat external sides disposed chordally with respect to said cylindrical surface and having lateral edges in slidable contact therewith and defining longitudinal air passages therewith in communication with said inlet port via said air accumulating head, said members comprising bight portions interconnecting the respective legs thereof and in engagement with said transaxial surface at said outlet port, said legs having free ends spaced axially from said transaxial surface at said inlet port to accommodate expansion of said legs into the air accumulating head attendant to said cage being heated during operation of the valve, a valve disk having an annular periphery closely fitting between said legs at the free ends thereof and movable axially of the housing, and spring means within the cage interposed between said disk and bight portions and biasing said disk into closing engagement with the seat and urging said cage in a direction engaging the bight portions with the transaxial surface at said outlet port.

2. The invention according to claim 1 and said bight portions presenting convex surface areas in engagement with said transaxial surface at said outlet port.

3. The invention according to claim 1 and said cage being formed of metal and said disk being formed of "Delrin."

References Cited

UNITED STATES PATENTS

| | | |
|---|---|---|
| 863,449 | 8/1907 | Richardson et al. __ 137—329.04 |
| 2,327,600 | 8/1943 | Kennon _____ 137—329.02 |
| 2,649,277 | 8/1953 | Blackford _____ 137—543.19 X |
| 2,768,994 | 10/1956 | MacDonald _____ 260—67 |
| 2,912,000 | 11/1959 | Green _____ 137—533.19 X |
| 3,002,528 | 10/1961 | Leissner _____ 137—543.19 X |
| 3,084,709 | 4/1963 | Flick et al. _____ 137—543.19 X |
| 3,334,649 | 8/1967 | Thompson _____ 137—329.04 |
| 3,335,750 | 8/1967 | Kepner _____ 137—539 |
| 3,412,931 | 11/1968 | Palmer _____ 251—368 |

WILLIAM F. O'DEA, Primary Examiner

D. J. ZOBKIW, Assistant Examiner

U.S. Cl. X.R.

251—368